United States Patent

[11] 3,628,203

[72] Inventor Lutz Nohse
Niels-Bohr-Ring 5, 2400 Lubeck, Germany
[21] Appl. No. 802,884
[22] Filed Feb. 27, 1969
[45] Patented Dec. 21, 1971
[32] Priorities Mar. 2, 1968
[33] Germany
[31] P 15 56 825.9;
Aug. 14, 1968, Germany, No. J 18274;
Aug. 16, 1968, Germany, No. J 18275

[54] AMPHIBIAN TRAILER
5 Claims, 7 Drawing Figs.
[52] U.S. Cl. ................................................ 9/1 T,
280/414 A, 280/415 R, 280/490, 287/14
[51] Int. Cl. .............................................. B63c 13/00
[50] Field of Search ......................................... 9/1 TR, 2,
1.5, 2 F, 2 S, 1; 280/490, 462, 474, 467, 405, 415,
479.1, 479.3, 491.1, 5, .6, 492–495; 287/14, 105,
115; 244/100–102

[56] References Cited
UNITED STATES PATENTS
2,507,793 5/1950 Lenci et al. ................... 9/1
2,893,019 7/1959 Renfroe et al. ............... 9/1
2,967,719 1/1961 Williams ....................... 9/1 X
1,553,095 9/1925 Moore .......................... 287/14
2,816,672 12/1957 Facchini ....................... 287/14
3,090,973 5/1959 Levinson ...................... 9/1
3,095,585 7/1963 Thomas ........................ 9/1
3,114,157 12/1963 Stockmann ................... 9/1
3,121,238 2/1964 Levinson ...................... 9/1
3,289,225 12/1966 Isch et al. ..................... 9/1

Primary Examiner—Milton Buchler
Assistant Examiner—F. K. Yee
Attorney—Polachek & Saulsbury ABSTRACT: In an amphibian trailer comprising wheels each rotatably mounted on a pivotal spring arm and each individually movable out of a lower position for traveling on land into an upper position when floating on water, in which latter position the wheels are accommodated in wheel boxes forming parts of the undercarriage of the trailer to which they are connected in a watertight manner, the provision of: an adjustment arm pivotal about a common axis with the spring arm and extending angularly thereto, spring means connecting the free ends of both arms, and drive means in form of a threaded spindle and nut engaging the adjustment arm and operable from the interior of the trailer; a bifurcated tow bar adapted to be coupled to a motor vehicle and pivoted with its fork ends by clutch means to the undercarriage of the trailer lockable in any position between a lower and an upper position, the tow bar in a raised position serving simultaneously to support a platform hinged to the undercarriage; a course stabilizing plate vertically extending from the tow bar into the water when the tow bar is in its lower, substantially horizontal position; and mounting means for an outboard motor arranged at that end of the trailer which forms the stern when floating.

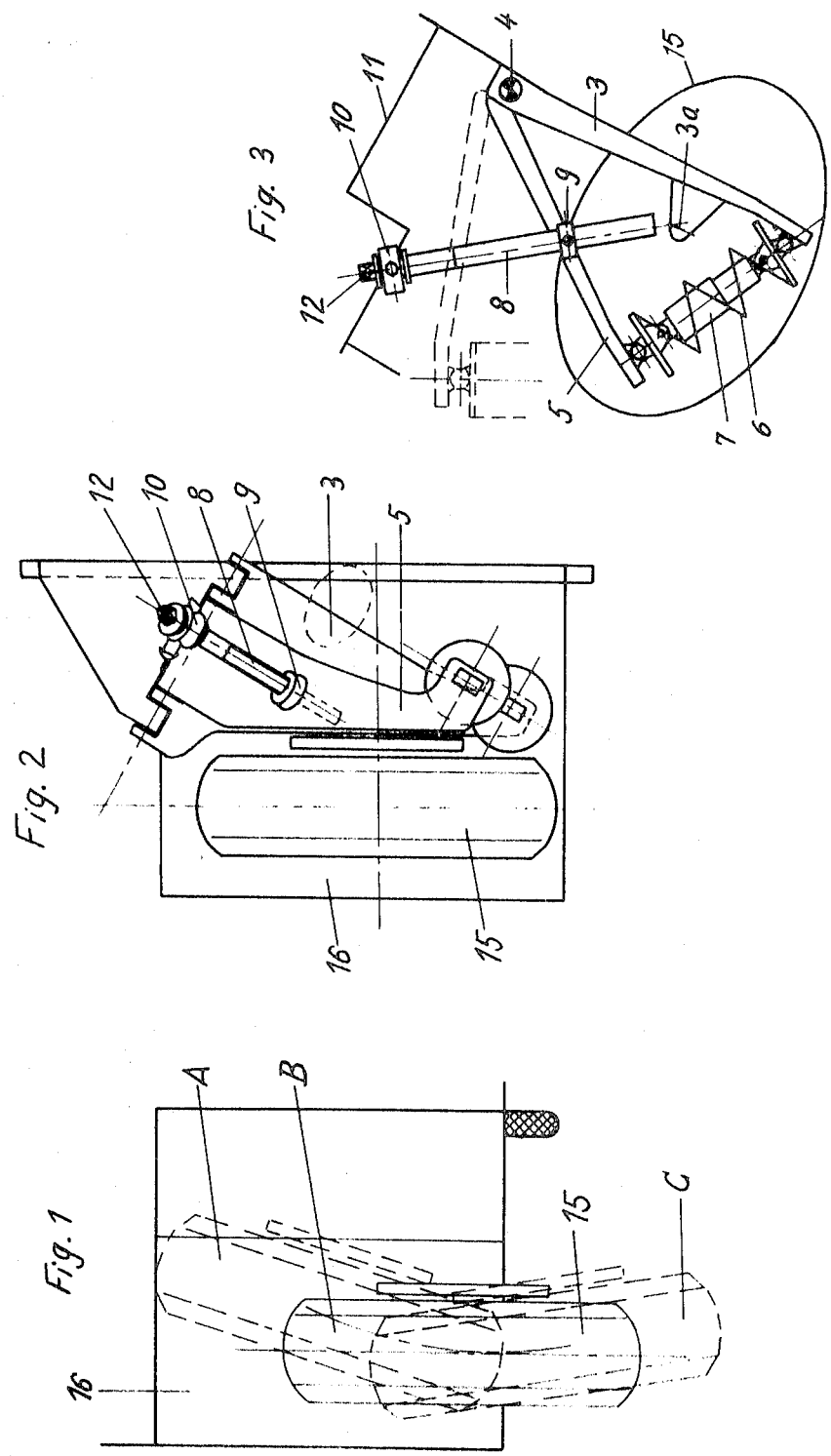

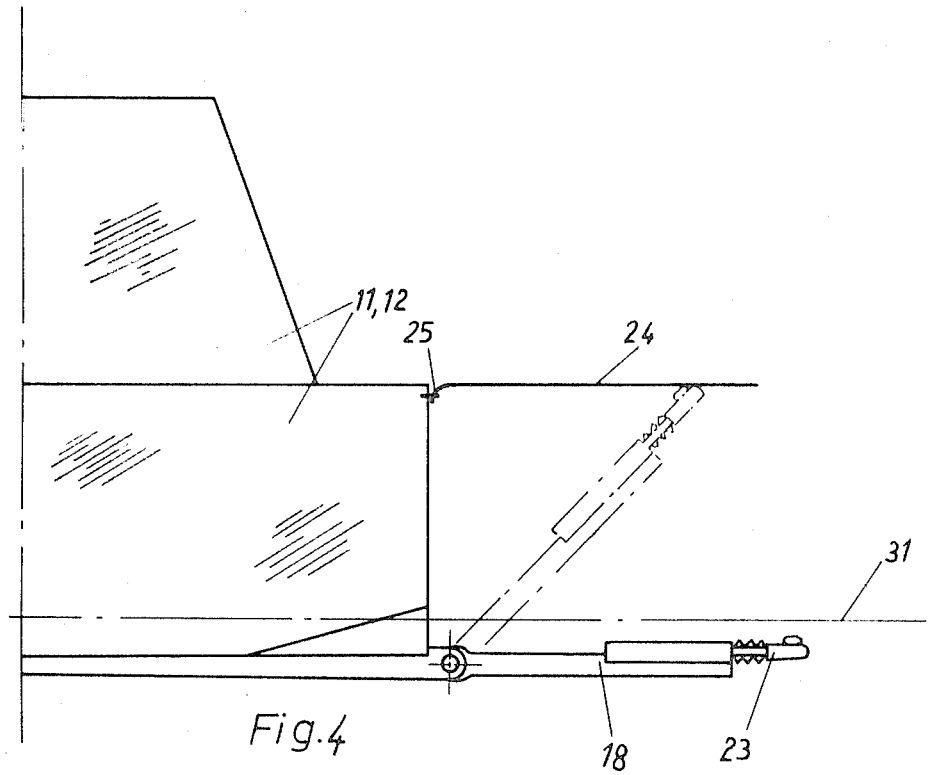
Fig. 4
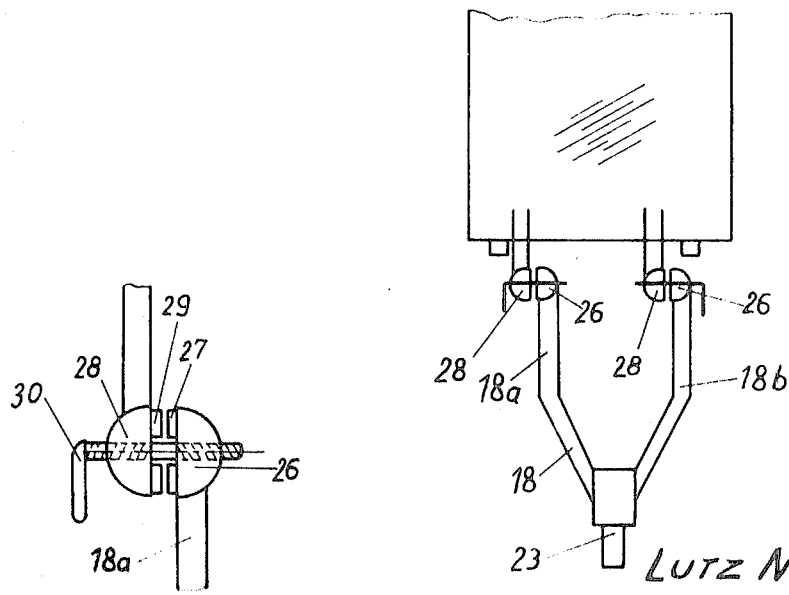
Fig. 6
Fig. 5

AMPHIBIAN TRAILER

BACKGROUND OF THE INVENTION

In the known amphibian trailers the retraction of the wheels generally does not offer any difficulties when the vehicle is floating on the water and the retraction mechanism merely has to lift the weight of the wheels when retracting them into the wheel boxes provided thereabove. However, a retraction of the wheels is not possible by means of the hitherto known retraction mechanism when the vehicle stands on solid ground, due to its great weight. But it is frequently desirable to adjust the ground clearance for the operation on land, namely an adjustment between the normal traveling position and a position when traveling over uneven ground. Finally it is of disadvantage that the wheels, due to their upright position within the wheel boxes, which protect the wheels and the wheel suspensions against influences of the water during the floating state, require a relatively spacious wheel box, thereby decreasing the utilizable inner space of the vehicle.

The known amphibian trailers with retractable wheels are provided with a rigid bifurcated tow bar and a running-up brake by means of which the trailer may be coupled to a motor vehicle. When the trailer is moved into the water and floats the two bar is also submerged and the running-up brake mechanism is exposed to the water too, whereby its functioning may be interferred by the formation of rust, settling of dirt, or the like. In addition the generally horizontal, or substantially horizontal tow bar may dig itself into the bank when the trailer is moved out of the water thus obstructing the movement of the trailer out of the water.

It is an object of this invention to provide an amphibian trailer, or caravan, wherein the wheels may be adjusted in a simple manner regardless whether the vehicle is floating on water or standing on rigid ground.

Another object of the invention is to provide a wheel suspension and a wheel adjustment mechanism for an amphibian trailer designed in such a manner that the otherwise interfering wheel boxes require a minimum of space within the vehicle.

Still another object of this invention is to provide an advantageous construction of the tow bar, whereby the aforementioned drawbacks are avoided.

Still further objects will become apparent as the description progresses.

SUMMARY OF THE INVENTION

In an amphibian trailer comprising a body including an upper part and undercarriage wheels each rotatably mounted on a spring arm pivotally secured to said undercarriage and movable individually with said wheel between a lower position when traveling on land and an upper position when floating on water, wheel boxes provided in said undercarriage connected thereto in a watertight manner each receiving a wheel in its upper position, a preferably bifurcated tow bar attached to said undercarriage adapted to be coupled to a motor vehicle, one feature of the invention resides in that an adjustment arm is pivotally supported on a common axis with said spring arm both arms being pivotal relative to each other and extending angularly to each other and having their free ends connected by spring means, said adjustment arm being engaged by a spindle drive including a nut and a threaded spindle extending therethrough operable from the interior of the trailer, whereby said wheels are movable out of said lower position into said upper position along an arcuate path so as to assume a canted position in their upper positions within said wheel boxes.

The threaded adjustment spindle together with a spindle nut is suitably secured to a fixed point of the carriage, or the like, and to the adjustment arm. The threaded spindle may be mounted pivotally either on the carriage, or the like, or on the adjustment arm, and the same applies also to the spindle nut.

The spindle may a. either be rotated by a drive mechanism thereby moving a nonrotatable spindle nut in axial direction longitudinally along the spindle and causing the adjustment, or b. be stationary and the spindle nut may be rotated by a drive mechanism thereby moving it in axial direction and causing the adjustment.

In order to avoid the aforementioned disadvantages afflicted with the known arrangement of the tow bar, the fork ends of the bifurcated tow bar, may, according to the invention, be pivotally connected to a pivot bearing provided on the trailer, and may be locked in any desired inclined position relative to the horizontal.

When the trailer is moved into the water it is possible by releasing suitable lock means, such as a claw coupling, to pivot and tow bar out of a substantially horizontal position for the road travel into any desired upwardly inclined position and to lock it again in this position, whereby the tow bar together with the susceptible parts of the running-up brake remain clear of the water. When locked in this inclined position the tow bar cannot dig itself into the bank when it is intended to tow the trailer out of the water. By means of this construction it is also possible to support with the free end of the inclined tow bar a platform pivotally connected with one edge to the trailer, whereby the useful area of the trailer is increased.

Further advantages and features of the invention will become apparent from the following description of one exemplified embodiment of the invention in connection with the attached drawings.

BRIEF DESCRIPTION OF THE DRAWINGS

FIG. 1 is a schematic view of a wheel and a wheel box viewed from the rear toward the wheel;

FIG. 2 is a top view of the wheel suspension and the adjustment mechanism;

FIG. 3 is a simplified partial side view of the parts shown in FIG. 2;

FIG. 4 is a schematic partial side view of a floatable trailer with the tow bar construction according to the invention showing the horizontal position of the tow bar in full lines and the inclined position in phantom lines;

FIG. 5 is a schematic top view of the embodiment shown in FIG. 4, however without the platform;

FIG. 6 is a top view of one of pivot connections of the tow bar in a larger scale.

DESCRIPTION OF THE PREFERRED EMBODIMENT

Figure 7:
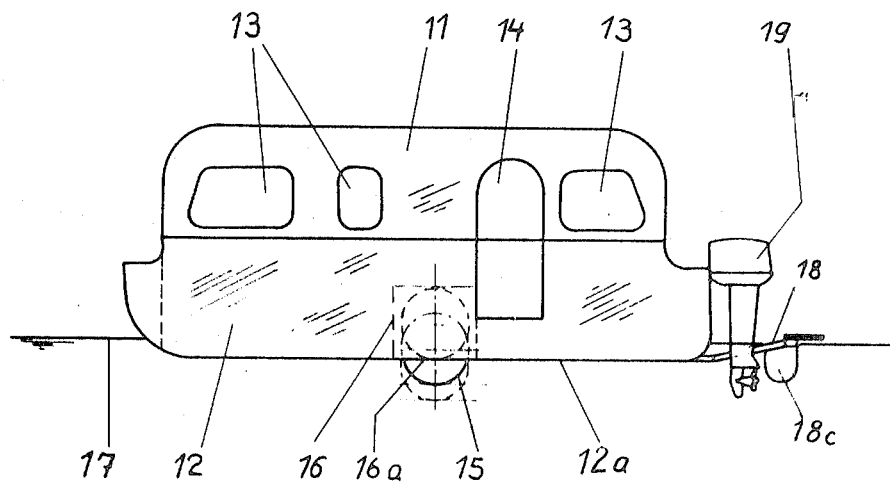
FIG. 7 is a schematic side view of the trailer.

The trailer shown in FIG. 7 comprises an upper carriage portion 11 and a lower carriage portion, or watertight undercarriage 12 of glass fiber reenforced plastic material having a double walled bottom filled and insulated with foamed material, carrying steel frame members required as supporting members are embedded in the material of the undercarriage so that the outer surface is smooth and does not show any projections, which otherwise would interfere with the streamline character. Windows 13 and one or more doors 14 are provided in the sidewalls of the trailer, as is common practice. In addition the trailer is provided with cleats for tying the same, with boxes for ropes and anchors, and other accessories required for the floating operation, of which some shall be described as the description progresses.

Watertight wheel boxes 16 are arranged above the vehicle's wheels 15 within which the wheels 15 are received with their upper portions. The wheel boxes 16 may be made of sheet metal or of plastic material, as in case of the undercarriage 12. At their lower ends they must be connected to the undercarriage 12 in a watertight manner, so as to prevent the entrance of water into the interior of the vehicle. The upper ends of the wheel boxes disposed above the water line may be open, or covered in any suitable manner.

The lower openings 16a of the wheel boxes are substantially disposed in the plane 12a of the bottom of the undercarriage.

In order to avoid the disadvantageous influences of these openings, unfavorable in view of the flow resistance and thus with respect to the floating behavior, these openings may be closed with plates (not illustrated) as soon as the wheels 15 are moved into their upper positions of rest for the floating operation. These cover plates are disposed in suitable guides and may be moved from the driver's seat, or from any other suitable place of the interior of the trailer with the aid of ropes, rods, or the like into their closing position, or vice versa.

The tow bar 18, which may be galvanized or otherwise protected against rusting, is arranged at that end of the vehicle which forms the stern of the floating trailer. By means of this measure good floating performances have been achieved, which are considerably improved yet, in that a course stabilizing plate 18c vertically disposed in the water is attached to the tow bar 18, by means of which the lateral plane and thus the resistance against drifting is increased. The stabilizing plate 18c may, for example, be pivotally supported allowing to raise the same during road travel.

An outboard motor 19 serves as a drive for the floating trailer and is either mounted on the tow bar 18 or a stern mounting plate of the trailer. The arrangement of the motor 19 at this end of the trailer is insofar of advantage that the motor does not have to be removed during the road operation. In order to avoid the propeller of the motor striking the ground, and in order to facilitate the slipping of the trailer into the water, the trailer is preferably provided with a motor having a shaft with a lower pivoted end which, together with the propeller may be swung upwardly and locked in this position. On the other hand this advantage may also be achieved by mounting the motor on the trailer in such a manner that it may be lifted, or pivoted for road operation. Due to the weight of the motor the axis of the wheels will have to be shifted a certain amount forwardly toward the tow bar, so that the load on the tow bar does not exceed the admissible limit.

The wheel suspension and adjustment mechanism shown in FIGS. 1 to 3 for one wheel is provided for each wheel of the amphibian trailer. Above each wheel the bottom open, watertight wheel box 16 is arranged, into which, upon changing from road to floating operation, the wheel is moved upwardly from below with the aid of the adjustment mechanism, to be described as the description progresses.

In FIG. 2 and FIG. 3, the wheel 15 is rotatably mounted on a spring arm 3 at 3a pivoted about the pivot axis 4. One end of the pivotal adjustment arm 5 may coincide with the axis 4. Spring means 6, in form of a helical spring, a rubber spring, or a compressed air spring, are provided between the free ends of the two pivotal arms 3 and 5. In order to dampen the wheel vibrations damping means 7 are also provided between the two ends of the pivotal arms, which may be a well-known shock absorber.

In FIGS. 2 and 3, a threaded spindle drive operable from the interior of the trailer engages the adjustment arm 5 according to the invention. In the illustrated exemplified embodiment the spindle 8 is threaded through a spindle nut 9 pivotally connected to the adjustment arm 5, while the drive mechanism 10 of the spindle drive is pivotally mounted on a stationary member, such as the carriage 11, or the like. The upper end of the threaded spindle 12 is provided, for example, with a square head which may be engaged by a socket wrench, or a crank with a corresponding square recess. By rotating the threaded spindle 8 with the aid of the crank either in left- or right-hand direction the entire wheel suspension is adjusted upwardly or downwardly. In order to facilitate the manual operation of the adjustment a reduction gearing may be arranged between the manual drive and the threaded spindle.

Generally the self-locking character of the threaded spindle and possibly the interposed reduction gearing will be sufficient to lock the respective position of the wheels. However, in order to be sure that the wheels are locked in their respective adjusted position the spindle drive may be locked additionally by any suitable individual locking means.

As is clearly shown in FIG. 1 the wheel moves, due to the particular wheel suspension by means of two pivotal arms, through a part of an arc when it is pivoted between its two possible end positions. In its upper position A the wheel has a tilted or canted position within the wheel box, whereby the height of the wheel box may be less in comparison with the hitherto common upright position of the wheel when the trailer is floating. Position B shows an intermediate position which is generally chosen for the normal road travel. By correspondingly constructing the drive of the spindle and the suspension of the wheel the latter may be readily adjusted to assume the position C, a position which is of great advantage when traveling over rough ground due to the greater ground clearance.

Due to the fact that, when on land, the trailer may be lowered until it seats with its undercarriage on the ground, the wheels or tires respectively are relieved and the entering and exiting is facilitated, whereby an otherwise required ladder or stairs is omitted. The system of the double arm, namely the adjustment arm 5 and the spring arm 3 which are pivotally supported on a common axis, additionally offers the advantage that the spring 6 and damping means 7 always occupy the same position relative to each other regardless of the adjusted position of wheels relative to the ground.

In FIGS. 4 to 6 the carriage and the mounting of the tow bar 18 are shown. The tow bar includes a well-known conventional running-up brake 23. The fork ends of the tow bar are pivotally attached to the trailer in such a manner that the tow bar may be set and locked in any inclined position relative to the horizontal. The position of the tow bar, when the amphibian trailer is traveling on land, is shown in full lines. When it is intended to move the trailer into the water lock means, such as claw clutches, are released, whereupon the tow bar may be swung upwardly, as shown in phantom lines in FIG. 4. The tow bar assumes this position after the floatable trailer has been moved into the water in which position it is out of the water, i.e. above the water line 31, whereby the susceptible parts of the running-up brake are not exposed to the water, thereby preventing the formation of rust, the entrance and settling of dirt, and the like. The upwardly tilted position of the tow bar is also of advantage when the trailer is to be moved out of the water, because there is no possibility that the tow bar might dig itself into the bank of the water.

In one of the upwardly tilted and locked positions shown in phantom lines in FIG. 4 the tow bar simultaneously serves to support a platform 24 secured with one edge 25, for example by hinges, or hooks respectively, to the undercarriage 12 of the trailer. By means of this platform, which is supported by the tow bar, the area, allowing to be walked on when the trailer is floating, is increased considerably. The locking of the tow bar in any desired tilted position of the tow bar relative to the horizontal is, for example, achieved in the following manner. Each fork arms 18a and 18b of the tow bar is provided with a hemisphere 26 having radical claws 27, or teeth respectively, provided at its plane face. The plane faces of the two hemispheres 26 are both facing in the same direction. On the other hand two equal hemispheres 28 are secured to the trailer, the plane faces of which are facing the plane faces of the hemisphere 26. The plane faces of the hemisphere 28 are also provided with radical claws 29. Both pairs of hemispheres 26 and 28 are provided with a central bore extending therethrough, of which one bore is provided with a left-hand inner thread, while the other bore is provided with a right-hand inner thread, and a threaded bolt 30 with corresponding left- and right-hand threads engages and extends through the threaded bores, so that by rotating the bolt 30 the pair of hemispheres 26 and 28 may be moved away from each other or toward each other, depending on the direction of rotation, whereby in the latter case the claws 27 and 29 interengage each other while upon rotation of the bolt 30 in the opposite direction the interengaged claws are released.

Due to this type of pivot connection between the tow bar and the trailer it is possible, after each of both pairs of hemispheres have been moved apart, to pivot the tow bar to assume any desired position and to lock it in this position again by moving the hemispheres toward each other into their interlocking position. Of course, it is also possible to use annular discs as clutch members 26 and 28 instead of the hemispheres having radical claws provided at their facing sides. Finally it is also possible to use any other pivot connections between the tow bar and the trailer, provided it is possible to connect the tow bar in any position rigidly to the trailer and to pivot the tow bar upwardly or downwardly after the lock has been released.

What is claimed:

1. An amphibian trailer comprising a body including an upper part and undercarriage, wheels each rotatably mounted on a spring arm pivotally secured to said undercarriage and movable individually with said wheel between a lower position when traveling on land and an upper position when floating on water, wheel boxes provided in said undercarriage connected thereto in a watertight manner each receiving a wheel in its upper position, a bifurcated tow bar attached to said undercarriage adapted to be coupled to a motor vehicle, an adjustment arm pivotally supported on a common axis with said spring arm, both arms being pivotal relative to each other and extending angularly to each other and having their free ends connected by spring means, said adjustment arm being engaged by a spindle drive including a nut and a threaded spindle extending therethrough operable from the interior of the trailer whereby said wheels are movable out of said lower position into said upper position along an arcuate path so as to assume a canted position in their upper positions within said wheel boxes, and said tow bar's free end being able to assume a locked inclined position supportable of a platform for walking thereon with one edge secured to said body.

2. An amphibian trailer comprising a body including an upper part and undercarriage, wheels each rotatably mounted on a spring arm pivotally secured to said undercarriage and movable individually with said wheel between a lower position when traveling on land and an upper position when floating on water, wheel boxes provided in said undercarriage connected thereto in a watertight manner each receiving a wheel in its upper position, a bifurcated tow bar attached to said undercarriage adapted to be coupled to a motor vehicle, an adjustment arm pivotally supported on a common axis with said spring arm both arms being pivotal relative to each other and extending angularly to each other and having their free ends connected by spring means, said adjustment arm being engaged by a spindle drive including a nut and a threaded spindle extending therethrough operable from the interior of the trailer whereby said wheels are movable out of said lower position into said upper position along an arcuate path so as to assume a canted position in their upper positions within said wheel boxes, two pairs of circular discs one for each fork end of said tow bar and each pair having one disc secured to the fork end and one disc secured to the trailer, both discs of one pair having a central threaded bore extending therethrough of which the threaded bore of one disc has a left-hand thread and the other disc has a right-hand thread, a threaded bolt with corresponding left- and right-hand threads extending through said threaded bores which is rotatable from the outside, and the surfaces of the discs of each pair which are facing each other being provided with claw-teeth means interengaging each other.

3. An amphibian trailer according to claim 2, wherein the circular discs are formed as hemispheres, the plane surfaces of which facing each other being provided with said claw-teeth means.

4. An amphibian trailer comprising a body including an upper part and undercarriage, wheels each rotatably mounted on a spring arm pivotally secured to said undercarriage and movable individually with said wheel between a lower position when traveling on land and an upper position when floating on water, wheel boxes provided in said undercarriage connected thereto in a watertight manner each receiving a wheel in its upper position, a bifurcated tow bar attached to said undercarriage adapted to be coupled to a motor vehicle, an adjustment arm pivotally supported on a common axis with said spring arm both arms being pivotal relative to each other and extending angularly to each other and having their free ends connected by spring means, said adjustment arm being engaged by a spindle drive including a nut and a threaded spindle extending therethrough operable from the interior of the trailer, whereby said wheels are movable out of said lower position into said upper position along an arcuate path so as to assume a canted position in their upper positions within said wheel boxes, and a course stabilizing plate arranged on said tow bar.

5. An amphibian trailer comprising a body including an upper part and undercarriage, wheels each rotatably mounted on a spring arm pivotally secured to said undercarriage and movable individually with said wheel between a lower position when traveling on land and an upper position when floating on water, wheel boxes provided in said undercarriage connected thereto in a watertight manner each receiving a wheel in its upper position, a bifurcated tow bar attached to said undercarriage adapted to be coupled to a motor vehicle, an adjustment arm pivotally supported on a common axis with said spring arm both arms being pivotal relative to each other and extending angularly to each other and having their free ends connected by spring means, said adjustment arm being engaged by a spindle drive including a nonrotatable nut and a threaded spindle extending therethrough operable from the interior of the trailer, the lower end of said threaded spindle being threaded through said nut pivotably connected to said adjustment arm and an upper end of said spindle being pivotally, rotatably and axially nonshiftably mounted at a fixed point of said undercarriage, whereby said wheels are movable out of said lower position into said upper position along an arcuate path so as to assume a canted position in their upper positions within said wheel boxes.

* * * * *